US006394164B1

(12) United States Patent
Lafond

(10) Patent No.: US 6,394,164 B1
(45) Date of Patent: May 28, 2002

(54) STRIP APPLYING HAND TOOL WITH CORNER FORMING APPARATUS

(76) Inventor: Luc Lafond, 23 Woodvalley Drive, Etobicoke, Ontario (CA), M9A 4H4

( * ) Notice: Subject to any disclaimer, the term of this patent is extended or adjusted under 35 U.S.C. 154(b) by 0 days.

(21) Appl. No.: 09/424,910

(22) PCT Filed: Jun. 1, 1998

(86) PCT No.: PCT/CA98/00530

§ 371 (c)(1), (2), (4) Date: Dec. 1, 1999

(87) PCT Pub. No.: WO98/55725

PCT Pub. Date: Dec. 10, 1998

(30) Foreign Application Priority Data

Jun. 2, 1997 (CA) .............................................. 2206938

(51) Int. Cl.$^{7}$ ................................................ B32B 31/00

(52) U.S. Cl. ........................ 156/523; 156/101; 156/102; 156/109; 156/211; 156/257; 156/574; 156/579; 156/468; 156/486

(58) Field of Search ................................ 156/523, 101, 156/102, 109, 211, 257, 574, 579, 468, 486, 252, 256, 391, 510, 513, 525, 162, 199; 83/879, 883

(56) References Cited

U.S. PATENT DOCUMENTS

| | | | | |
|---|---|---|---|---|
| 2,487,951 | A | 11/1949 | Stein | 190/126 |
| 2,916,079 | A | 12/1959 | Schiefer | 156/391 |
| 3,730,815 | A | 5/1973 | Terzian | 156/577 |
| 3,733,237 | A | 5/1973 | Wolff | 156/468 |
| 4,033,806 | A | 7/1977 | Lindenschmidt | 156/211 |
| 4,060,444 | A | 11/1977 | Schweig, Jr. et al. | 156/391 |
| 4,072,554 | A | 2/1978 | McKibben | 156/514 |
| 4,600,466 | A | 7/1986 | Herrmann | 156/391 |
| 4,623,421 | A | 11/1986 | Cardin | 156/523 |
| 4,699,686 | A | 10/1987 | Franke | 156/579 |
| 4,756,789 | A | 7/1988 | Kolff | 156/391 |
| 4,759,810 | A | 7/1988 | Jackson et al. | 156/64 |
| 4,769,105 | A | 9/1988 | Lisec | 156/468 |
| 4,849,063 | A | 7/1989 | McXinnon | 156/391 |
| 5,013,377 | A | 5/1991 | Lafond | 156/109 |
| 5,045,146 | A | 9/1991 | Rundo | 156/391 |
| 5,068,004 | A | 11/1991 | Moll | 156/494 |
| 5,269,871 | A | 12/1993 | Longworth et al. | 156/527 |
| 5,384,003 | A | 1/1995 | Mitchell | 156/510 |
| 5,472,558 | A | 12/1995 | Lafond | 156/523 |
| 5,635,019 | A | 6/1997 | Lafond | 156/574 |
| 5,975,181 | A | 11/1999 | Lafond | 156/523 |

FOREIGN PATENT DOCUMENTS

| | | |
|---|---|---|
| CA | 1234682 | 4/1988 |
| CA | 1339272 | 9/1989 |
| CA | 2043915 | 6/1991 |

*Primary Examiner*—Linda Gray
(74) *Attorney, Agent, or Firm*—McFadden, Fincham

(57) ABSTRACT

There is disclosed a strip applying tool for applying strip material to substrates. The tool includes at least one cutting blade to slit cut the strip material from its exterior surface into its body to thereby facilitate the formation fo a corner while maintaining the strip in a continuous uninterrupted length. The tool further provides a channel extending therein to receive strip material which provides a guide surface to permit the application of the strip to the substrate while maintaining a lower surface of the tool above the substrate to prevent moving or scratching of the substrate.

9 Claims, 3 Drawing Sheets

STRIP APPLYING HAND TOOL WITH CORNER FORMING APPARATUS

FIELD OF THE INVENTION

This invention relates to a strip applying tool for applying flexible strip material to a pair of opposed substrates, such as a flexible spacer applied to a pair of glass panes to form an insulated glass ("IG") assembly. More particularly, the invention relates to a strip applying tool which includes a cutting device for cutting into the body of a strip to permit the strip to form sharp corners, simultaneously during the strip application procedure.

BACKGROUND OF THE INVENTION

In general, when using rigid spacers, the spacer must be cut into precise lengths and the corners then joined by welding or the like. When using flexible spacers of the type comprising a flexible, substantially non-metallic body, such as a polymeric body, if the degree of flexibility is sufficient to permit a spacer to be bent around a corner, the only problem then arising is the "bunching" of the material at the corner which can affect the performance of the spacer in an assembled IG unit.

Numerous strip applying tools have been proposed in the art, however, these tools have limitations in that many of them incorporate many moving parts, which are susceptible to mechanical failure. In addition, during an application procedure of strip material to a substrate and more particularly, when a corner needs to be formed in the strip, the application procedure using generally known tools must be interrupted and the corner formed therein. As such, this not only has a negative impact on productivity, but additionally provides a potential "weak spot" in terms of the insulation capacity of the strip.

In earlier patents in this art, one solution was to punch out a portion of the flexible spacer internally of the spacer body so that a physical portion of the material was removed. Thus the spacer was able to form a tight 90° corner. However, by physically removing a portion of the material on the internal face of the spacer strip, the integrity of the strip can be destroyed relative to vapour or gas transmission. Spacers in use today include a desiccant strip or layer on the internal face, as well as a gas-impermeable layer and by removing a portion of the body at its internal face, the continuity of these layers is interrupted at several places throughout the IG assembly, which is undesirable.

SUMMARY OF THE INVENTION

One object of the present invention is to provide a tool for applying flexible strip material to a substrate having an edge and a major face, comprising a body having a lower surface and a channel extending therethrough for receiving strip material therein, a substrate positioning member adjacent the channel on the lower surface of the body for guiding,the tool along the edge of the substrate, the lower surface of the body being elevated from the major face when the strip material is fed through the channel, and cutting means for cutting into the body of the strip material at its external face, to permit the strip material to form sharp corners at corners of the substrate.

The substrate positioning member is formed from front and rear spaced apart guide members. At least one of the guide members is pivotally mounted to the tool body. The guide members are configured to be contiguous with an edge of the substrate as the tool is operated.

In the apparatus of the present invention, the cutting means preferably comprises a pair of reciprocating blades although in some cases, depending on the type of spacer material to be cut, a single blade can be used. The cutting means, in forming corners for the spacer strip, is intended to form a slit cut into the spacer body to a depth sufficient to part-way penetrate the body of the spacer and permit the spacer to form a sharp or tight corner such as in a 90° corner construction in rectangularly shaped IG units. The slit thus formed penetrates the spacer across its full height, i.e. the distance between the substrates, but to a depth only part-way across its width, i.e. the direction from the outer to the inner faces of the spacer. By using the apparatus and method of the present invention, and by virtue of the cutting means forming a slit cut only to a predetermined depth in the body, the integrity of the spacer at the internal surface of the spacer body is maintained while permitting sharp corners to be formed. Thus, the continuity of the barrier layers will not be interrupted.

The cutting blades will normally be mounted transversely of the direction of feed of the spacer through the apparatus. Suitable actuation means for actuating the blades can be employed. Such means may include a conventional on-off switch associated with the cutting blades. Where a pneumatic drive is employed for movement of the cutting means, suitable on-off pressure switches are appropriate.

A preferred embodiment of the invention utilizes a pair of reciprocating cutting blades; each may be provided with a separate drive system, using a common start-stop system. In the preferred embodiment, the cutting blades and their actuation assemblies can be mounted in a movable housing, with the degree of movement determining the depth of any cutting action into or through a spacer strip.

The tool of the present invention can include a feature to permit the cutting blades to cut right through the spacer body at the end of the spacer application i.e. where the start and finish ends of the spacer (normally at a corner of the IG unit) are to be joined. The device may thus include adjustable stop means; alternately, the cutting assembly may be movable between first, intermediate and final positions, for providing different types of cuts. In the case of adjustable stop means for the cutting device, a simple lock system may be employed to limit the movement of a cutting assembly.

The spacer type which can be used in the method and apparatus of the present invention is typically any flexible spacer which is known in the art. The material from which the spacer or strip can be made from materials such as butyl polymers, silicones, polyvinyl polymers and other such insulating bodies for spacer application to substrates e.g. glass lites for fabrication of insulated glass assemblies.

The channel within which strip material is fed into the tool may include a guide surface for elevating a portion of the strip off the surface of the substrate where the blades contact the strip. The guide surface is preferably angularly inclined relative to the lower surface of the tool. The inclination of the surface is such that the strip material is preferably disposed within the channel at an angle from about 2° to about 50° relative to the lower surface. More desirably, the angle of inclination is below about 30°.

Strip applicator means are preferably positioned at the rear of the tool body to provide a pressure to the strip to engage with the substrate. Various types of applicator means can be employed, a simple one being in the form of an angled guide or a rotatable roller.

The apparatus preferably includes means for spacing at least the front portion of the tool from the substrate surface while the apparatus travels along or is guided along the edge of the substrate. To this end, guide means for spacing at least the front portion of the tool from the substrate surface is employed. By this arrangement, the lower surface of the tool remains out of contact with the substrate thus avoiding any marring or scratching of the substrate surface.

The cutting member is preferably mounted adjacent the front end of the body in operative association with the strip channel. The cutting member provides a slit cut in the strip material to provide the cornering flex point, with reduced bulging, for the strip while it is fed through the channel in an uninterrupted manner. The corner flex point is located inwardly of the outer surface of the strip so that the strip remains continuous on its inner face.

The cutting blades may be actuated by pneumatic, electric or hydraulic systems, with suitable means such as on-off switch means being provided which can be controlled by an operator. Such means may be located in association with the apparatus or may even be foot-actuated by an operator. In a preferred form, the cutting blades are actuated by one or more pneumatic cylinders.

In another aspect of the present invention, the substrate positioning member preferably has the structure where there are front and rear spaced-apart positioning members. These may be in the form of one or more guides such as rotating rollers; there may in fact be guide assemblies in the form of two or more rollers at the front and back of the device. In a particularly preferred form, it has been found that by using spaced-apart guide rollers, and where the tool includes at least one tandem assembly, which is particularly useful where the apparatus is required to apply spacer for curve applications. Cornering is also facilitated while ensuring a smooth, reliable application of the spacer element.

In one version, at least one of the positioning members includes vertical guide members preferably comprising rollers, for contacting one or both of the sidewalls of the spacer for lateral positioning of the spacer on the substrate. The guides are preferably pivotable about a horizontal axis parallel to the elongate axis of the tool, to permit the guides to tilt by up to about 5° laterally relative to the elongate axis of the tool body and the strip, in either direction, relative to the tool body. This feature permits the tool to counteract the natural outwardly tilting tension and distortion acting on the spacer as the spacer is installed around a curved surface. Releasable retention means permit the operator to manually position the vertical guides at an appropriate angle as strip is installed around a curved substrate.

According to a further aspect of the present invention, there is provided a method of placing a strip of material proximate an edge of a substrate having a major face comprising the steps of providing a length of sealant strip from a supply thereof, providing a hand tool having a lower surface and strip feeding channel therein angularly inclined to the lower surface, feeding a length of the strip into the channel such that the lower surface is elevated from the major face, effecting securement of the strip to the edge of the substrate, and cutting the strip inwardly from its outer face with the tool at a corner of the strip to facilitate securement of the strip around a corner edge of the substrate.

The terms "spacer", "strip" and "strip material" are used generally interchangeably herein.

The directional references employed herein refer generally to the tool positioned for use on a horizontally positioned substrate, unless otherwise indicated. In referring to the spacer body, the term "height" refers to the distance between the substrates and "width" and "depth" refer to the distance between the inner and outer faces of the spacer.

Having thus generally described the invention, reference will now be made to the accompanying drawings illustrating preferred embodiments.

DETAILED DESCRIPTION OF THE PREFERRED EMBODIMENTS

Figure 1:
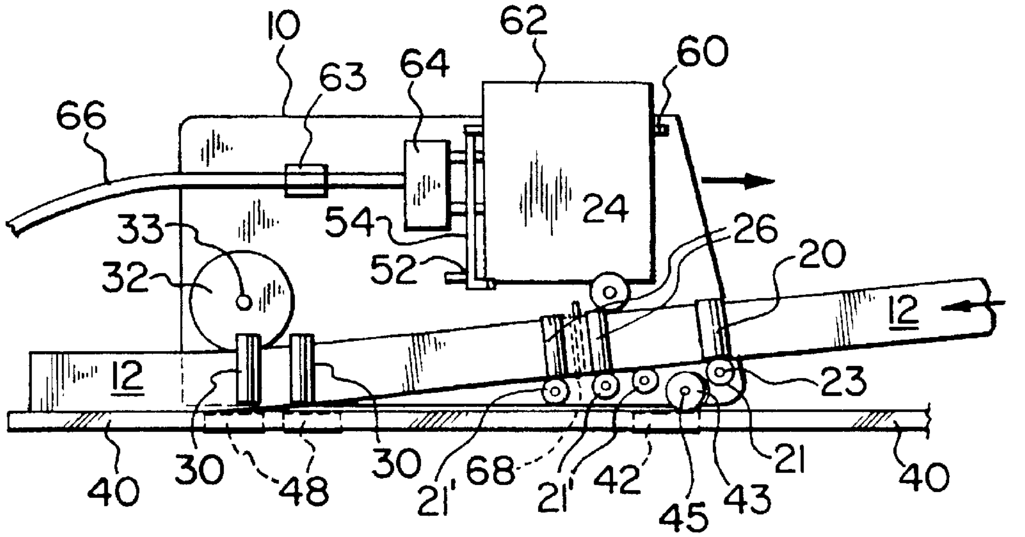
FIG. 1 is a side elevational view of an apparatus of the present invention.

Referring now to the drawings the apparatus of the present invention includes a main body or housing indicated generally by reference number 10. The housing includes a lower portion adapted to receive and guide a spacer strip indicated generally be reference numeral 12 into juxtaposition with e.g. a sheet of glass as part of the sequence of forming an insulated glass unit. The arrows shown in the Figures relative to the strip or spacer 12 indicate the direction of movement of the spacer through the apparatus.

The guide system of the front assembly **13*a* includes a front pair of spaced-apart vertical guide rollers 20 each journalled on shaft 22 forming an inlet for receiving the leading edge of a spacer 12 from a supply thereof (not shown). Guide rollers 20 operate in conjunction with one or more strip-supporting horizontal rollers 21 mounted on a shaft 23; guide rollers 21 form with guides 20 a generally U-shaped chamber through which the strip 12 passes in a supported manner. Additional supporting rollers 21'** may be employed depending on the nature of the spacer strip.

The rollers 21 and 21' together cooperate to define a guide surface for supporting the incoming spacer. The guide surface, the nature and function of which will be more fully described below, is conveniently angled relative to the substrate by between 2° and 50°, and conveniently less than 30°, such that the surface angles upwardly and forwardly. It will be further seen that the guide surface may comprise any convenient means for elevating a portion of the spacer above the surface of the substrate, where the cutting blades (described below) contact the spacer.

Two pairs of further guide rollers 26, mounted in a spaced-apart arrangement, each on a shaft 28, serve to form a downstream positioning arrangement for further guiding the spacer strip 12 and also to form a station therebetween for cutting the strip 12 when required. One or more top guide rollers 24 may be employed as desired.

Operating in conjunction with the above guide rollers 20 are two pairs of additional rear guide rollers 30 which in turn, operate in conjunction with a rear pressure roller 32 which is adapted to apply downward pressure on the top of the spacer strip 12 to place the same into contact with a glass strip 40 (normally along the side edge thereof). Guide rollers 30 are each provided with a shaft 34 for mounting the rollers in a vertical alignment. Pressure roller 32 may be adjustably mounted by suitable means (not shown) on its shaft 33 to accommodate different heights of spacer.

To support the front portion of the apparatus, a horizontal roller 43, journalled on a shaft 45, may be provided; the shaft 45 may be mounted to the tool body 10 in an appropriate manner. In a particularly preferred arrangement, shaft 45 journals the roller 43 in an angled relationship relative to the path of movement of the strip through the apparatus. Roller 43 operates on the surface of the glass to provide the desired support for the tool. The skewing or angle of mounting of roller 43 is typically an angle of a few degrees, to 10° or more, which can be employed to create a pulling action when the horizontal guide 42 (described hereinafter) is in contact with the edge of a glass lite. This action allows an operator to ensure that the tool is uniformly held against the substrate edge, which in turn permits a strip to be uniformly applied against the edge of the substrate.

In the apparatus, a front tool guiding roller 42 is mounted by means of a shaft 44 in a horizontal manner, and is positioned so as to permit the apparatus to run along the side edge of a glass substrate 40. Rear guiding rollers 48, mounted on shafts 50, provide a tandem guide assembly for the rear portion of the tool, thus permitting spacer to be applied tangentially to a glass curve. This tandem guide assembly preferably also mounts the pressure roller 32. The tandem guide assembly may include a frame 47 which mounts the various components associated with the rear assembly of the apparatus; the frame which mounts the tandem guides 48 may also be pivotable by being mounted on shaft 45 to permit the assembly to pivot about a fixed point.

Figure 2:
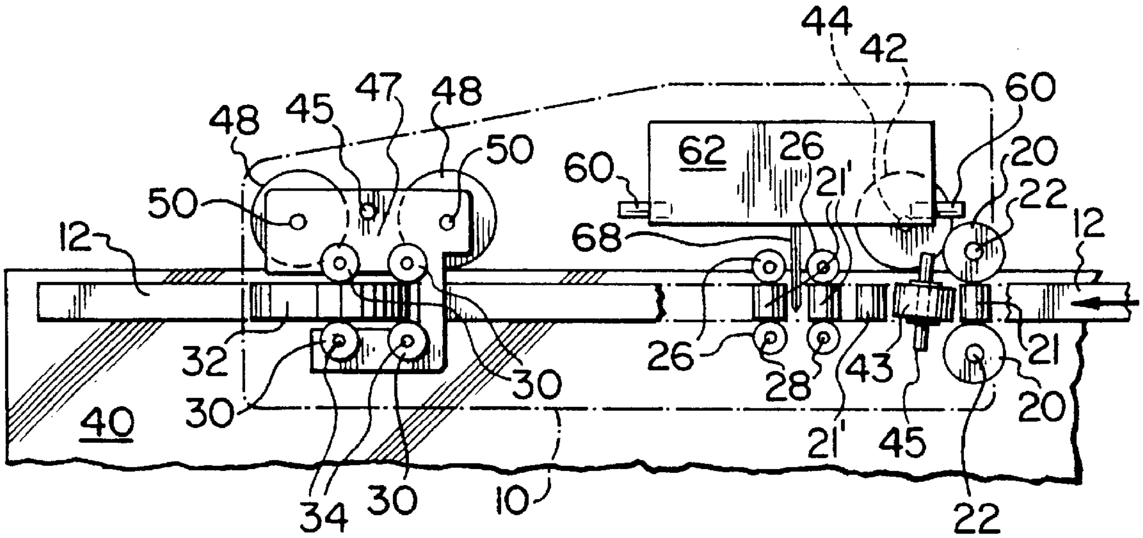
FIG. 2 is a side view of the apparatus of FIG. 1.
Figure 2A:
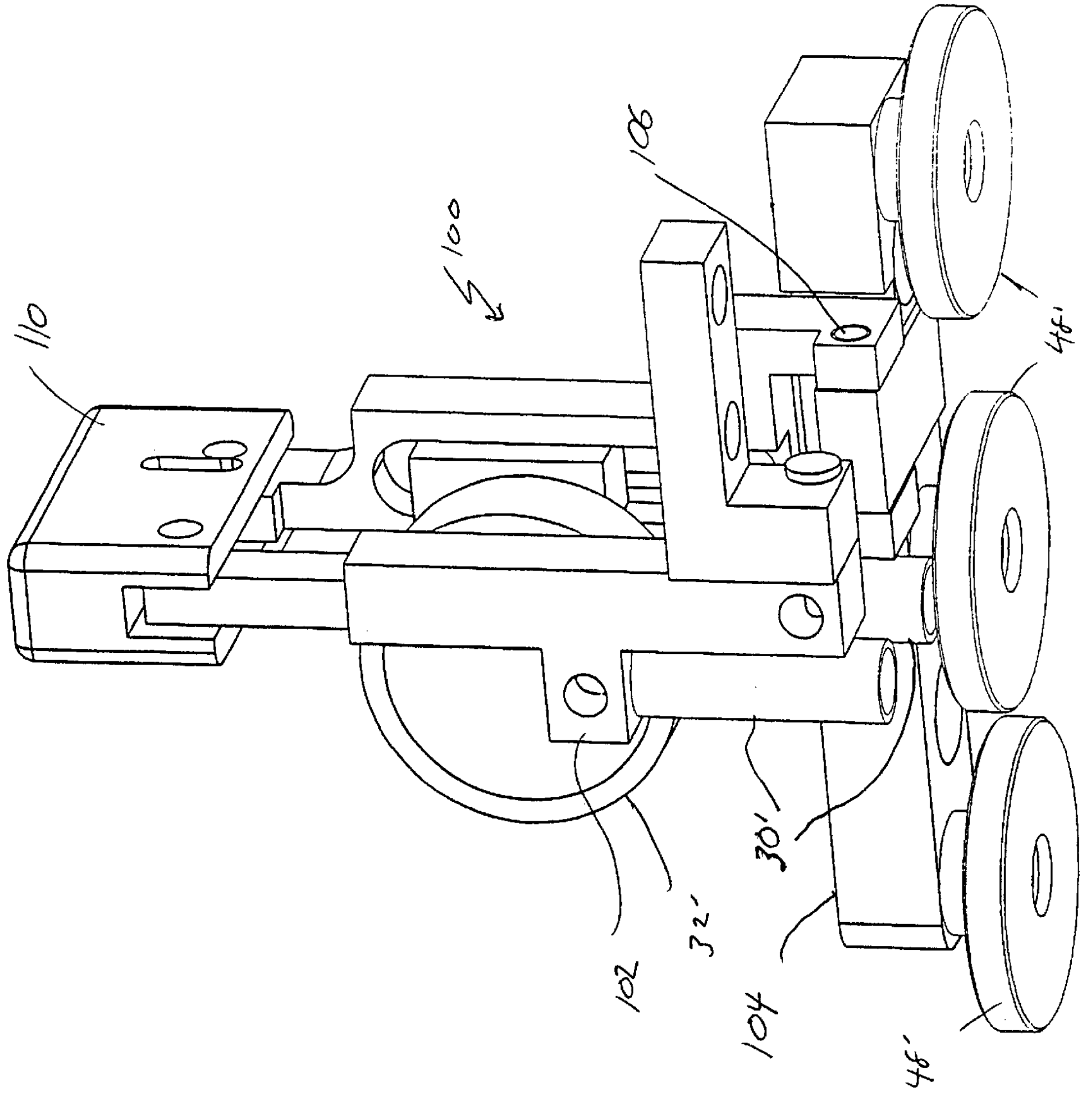
FIG. 2A is a perspective view of a portion of the apparatus illustrating a further embodiment.

In one version, shown in FIG. 2A, an assembly 100 is mounted within the housing 10 and encompasses rear guiding rollers 48', pressure roller 32' and vertically-oriented guide rollers 30' for contacting the sidewalls of the spacer strip and positioning the spacer laterally on the substrate. The vertical rollers 30' are mounted to a primary frame 102, which in turn is pivotally mounted to a secondary frame 104, by way of a pivot pin 106 for lateral tilting towards either side of the tool. The secondary frame 104 is fixedly mounted within the housing 10, and bears the guiding and pressure rollers 48' and 32'. Resistance means such as an o-ring seal provide a degree of resistance to permit the primary frame to maintain its position during use while permitting adjustment by the user. The pivotal movement permitted between the primary and secondary frame is about 5° from the vertical in either direction. The secondary frame 104 is fixedly mounted to the housing 10, while the primary frame is mounted to the housing 10 by pivotal mount means that permit movement about a horizontal axis parallel to the direction of travel of the tool.

In this manner, the vertical rollers 30' can tilt from the vertical by up to about 5° towards either side of the tool, permitting the tool to cant the strip by a like amount during application to a substrate. This is desirable, for example, when the strip is applied around a curved edge of a substrate, and permits a counteracting of the natural outwardly canting tendency of the strip.

A control lever 110 extends upwardly of the tool body 10 and joins the primary frame 102 to permit user operation of the lateral tilt feature.

Prior to describing the cutting assembly, it will be noted that the embodiment of the tool as illustrated includes pneumatically driven cutting means; to this end, a pivot hinge or shaft 60 is mounted to the body 10; an air cylinder 62 is provided and rotatably journalled on hinge or shaft 60. In a preferred form, the air cylinder 62 comprises a pair of pistons housed in a single casing in a side-by-side manner and arranged so as to provide reciprocating action between the respective pistons. Such side-by-side piston assemblies are known for other purposes and may be conventionally acquired. The assembly also includes an air valve 64, connected to an air supply conduit 66. An on-off switch 63 controls operation of the air supply.

Operatively associated with the piston assemblies are a pair of reciprocating cutting blades indicated generally by reference number 68; blades 68 are adapted for vertical reciprocation and are normally positioned by their respective piston assemblies outside the path in the axial direction of movement of the strip 12. Operating in conjunction with the cutting assembly is a lock assembly indicated generally by reference numeral 52; this functions to permit the cutting blades to vertically cut or slit through the body of the spacer 12. The slit thus formed extends through the full height of the spacer and a predetermined depth part-way into the spacer. In other cases, at the last corner, the lock assembly permits an operator to cut right through the body of the spacer 12. The lock assembly can have a fixed position as illustrated whereby the housing of the cylinder 62 abuts the same to prevent the movable cutting assembly from penetrating beyond a desired depth; the lock assembly can also be adjustable if desired to permit cutting of the spacer to various depths by suitable adjusting means, e.g. adjustment screws. In the arrangement shown, by mounting the locking assembly on a pivotable shaft, the operator upon movement of the shaft can permit the cutting blades to cut completely through the spacer.

The guide surface formed by rollers 21 and 21' serve to elevate the spacer above the substrate where the blades contact the spacer. This serves to prevent contact between the blades and the substrate. Further, it prevents contact of the spacer with the glass until the cutting steps are completed, thus minimizing adherence of the spacer to the substrate in an undesired position.

Figure 3A:
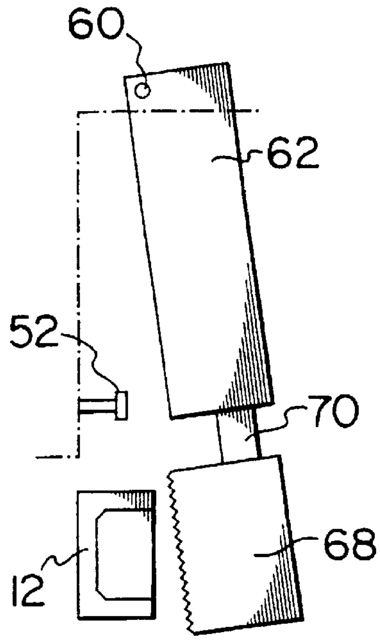
FIGS. 3A, B and C are sequential side views of the position of the blade members during a strip cutting procedure.
Figure 3B:
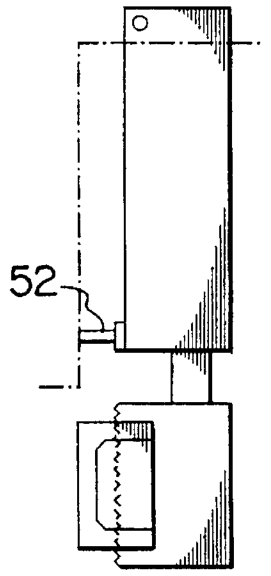

Referring now to FIGS. 3A, B and C, only a single cutting blade 68 is shown connected to a piston rod 70 of a respective actuating means, e.g. a piston 62. As seen in FIG. 3A, piston 62 is mounted on shaft 60 as described above. The diagrammatic illustration of FIG. 3A indicates the normal position of the cutting assembly during placement of spacer 12 on a glass lite where the cutting operation is not required. FIG. 3B shows that on actuation of the cutting assembly and movement thereof into the spacer, for forming a corner only, the cutting blade will advance width-wise across the spacer to a depth governed by the lock assembly 52. The assembly thus prevents the pivotal movement of the cutting assembly, and hence the cutting blades, beyond a predetermined depth into the body of the spacer 12.

Figure 3C:
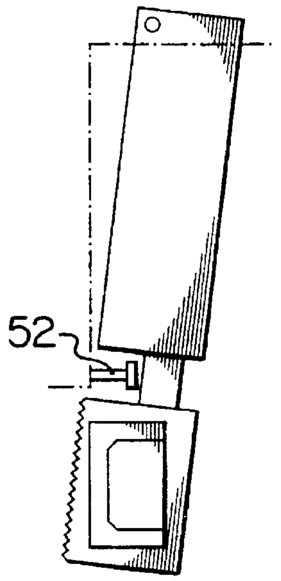

With reference to FIG. 3C, when it is desired to completely cut through the body of the spacer, as in the last cornering operation, the lock assembly 52 is removed from its locking position shown in FIG. 3B to permit the cutting assembly to travel right through the spacer 12 and to sever a length from the source of the spacer.

Figure 4A:
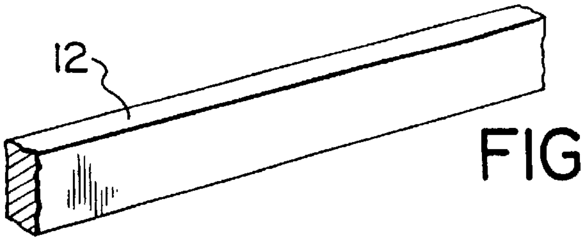
FIGS. 4A, B and C show various stages of a spacer element relative to the operation carried out on the spacer element by the apparatus of FIG. 1.
Figure 4B:
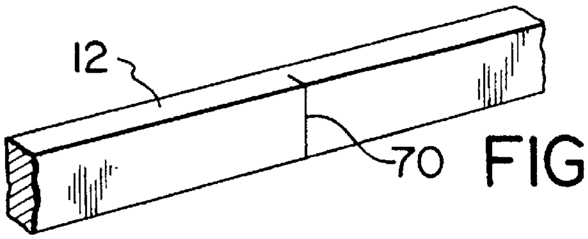
Figure 4C:
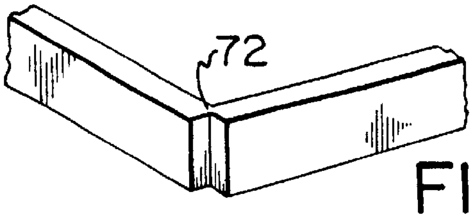

Referring to FIGS. 4A through 4C, a typical spacer 12, which may be used with the apparatus of the present invention, is shown in FIG. 4A. Normally this spacer comes in a continuous roll and typically may be made of a polymer or cellular material (with suitable adhesives being applied to the substrate engaging surfaces if required). FIG. 4A illustrates the spacer as it would be fed through the apparatus when the cutting assembly is not actuated.

In FIG. 4B, when the cutting assembly is actuated to make a slit-cut 70 partially through the spacer body, the cut would appear as illustrated and by turning the apparatus of the present invention around a corner, as in a cornering operation, the strip 12 will assume the configuration shown in FIG. 4C. In this manner, a portion of the strip remains as indicated by the ligament 72.

As those skilled in the art will realize, these preferred illustrated details can be subjected to substantial variation, without affecting the function of the illustrated embodiments. It will be obvious that the features of the present invention, in addition to being utilized in a hand tool, can also be utilized in automated equipment for applying spacer to a glass substrate. Although embodiments of the invention have been described above, it is not limited thereto and it will be apparent to those skilled in the art that numerous modifications from part of the present invention insofar as they do not depart from the spirit, nature and scope of the invention as defined in the accompanying claims.

I claim:

1. A tool for applying flexible strip material to a substrate having an edge and a major face, said strip material having a flexible body and sidewalls including an exterior face, said tool comprising:

a tool body having a lower surface and a channel extending therethrough for receiving strip material therein;

cutting means for cutting a transverse slit into an exterior surface of said flexible body of strip material part-way through said flexible body to permit said flexible body to be bent about a corner, said channel including front and rear guide members for guiding said tool along said edge of said substrate said front and rear guide members being mounted to said tool body for contact with said edge, at least one of said front and rear guide members comprising a pivotal guide member mounted to said tool body to pivot relative to said tool body whereby said pivotal guide member comprises a pair of guides retained within a frame, said frame being pivotally mounted to said tool body; and said lower surface of said tool body being elevated from said major face when said strip material is fed through said channel.

2. The tool as defined in claim 1, wherein said tool body includes a guide surface for elevating a portion of said strip material above said substrate where said cutting means contacts said strip material.

3. The tool as defined in claim 1, wherein said tool further includes a lateral guide member inclined relative to the axial direction of movement of said strip material, to maintain contact of said tool against said substrate edge as said tool is moved forwardly relative to said substrate.

4. The tool as defined in claim wherein there is included means for elevating a front portion of the tool body from a substrate surface.

5. The tool as defined in claim 1 wherein said cutting means comprises a pair of reciprocating knife means for selectively cutting said strip material to a selected depth inwardly of said exterior face.

6. The tool as defined in claim 1, further comprising at least one set of opposed vertical guide members positioned to contact the sidewalls of the strip material, said vertical guide members being pivotally mounted to said tool body for pivoting laterally about a horizontal axis generally parallel to the elongate axis of the strip material, for canting said strip material relative to said substrate, and towards either side of the tool relative to the direction of travel of the tool.

7. The tool as defined in claim 1, wherein said tool further includes a pressure roller mounted within said channel for pressurably applying said strip material to said substrate.

8. The tool as defined in claim 2, wherein said guide surface is inclined by between 2 degrees and 30 degrees from the horizontal when said tool is positioned on a horizontal substrate.

9. The tool as defined in claim 5, wherein said tool further includes stop means for limiting the degree of movement of said cutting means into the path of movement of said strip material, and means for individually actuating each of the pair of reciprocating cutting means.

* * * * *